July 27, 1965
M. W. McKAY
3,197,777
TACTICAL RADIO LANDING SYSTEM
Filed Nov. 29, 1961
2 Sheets-Sheet 1
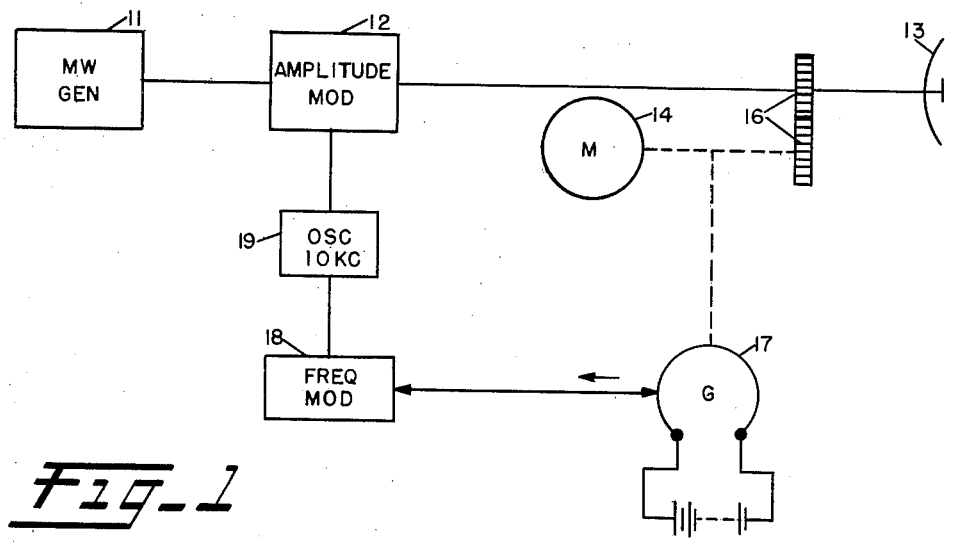
*Fig_1*
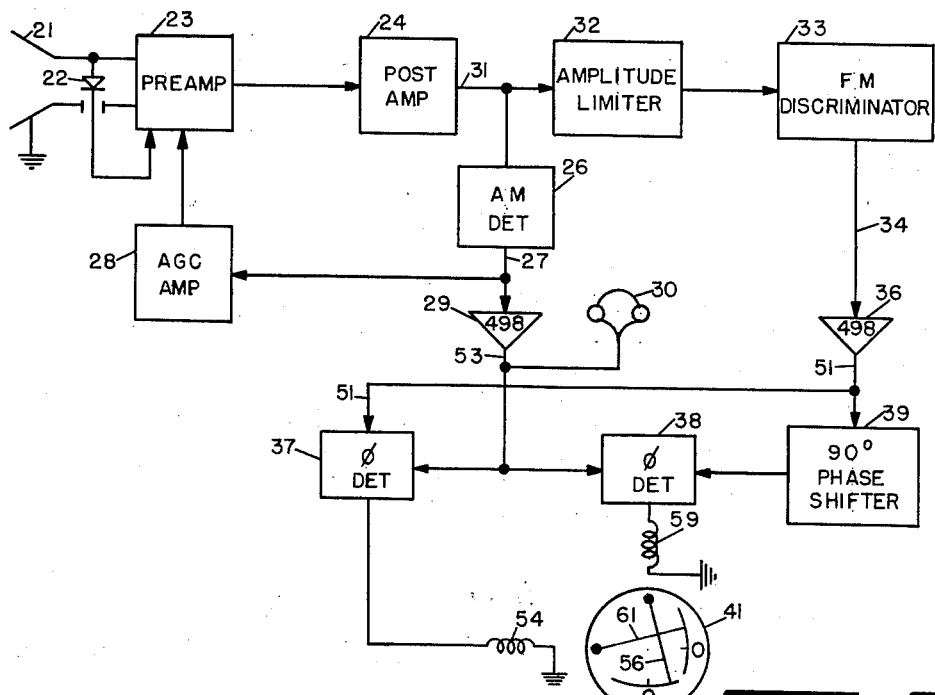
*Fig_2*
INVENTOR.
MICHAEL W. McKAY
BY
*H. L. Mackey*
ATTORNEY July 27, 1965
M. W. McKAY
3,197,777
TACTICAL RADIO LANDING SYSTEM
Filed Nov. 29, 1961
2 Sheets-Sheet 2
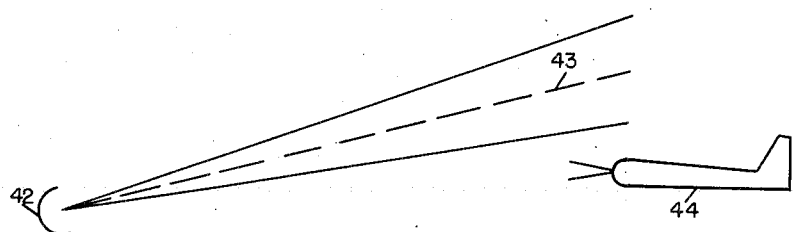
$FIG-3$
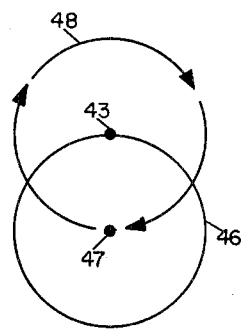
$FIG-4$
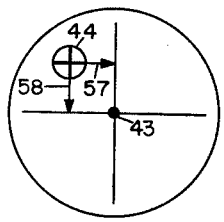 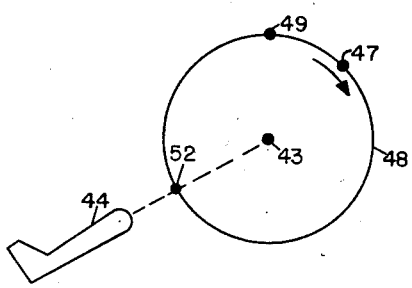
$FIG-6$ $FIG-5$
INVENTOR.
MICHAEL W. MCKAY
BY *H. H. Mackey*
ATTORNEY

United States Patent Office 3,197,777
Patented July 27, 1965

3,197,777
TACTICAL RADIO LANDING SYSTEM
Michael W. McKay, Tarrytown, N.Y., assignor to General
Precision, Inc., a corporation of Delaware
Filed Nov. 29, 1961, Ser. No. 155,581
4 Claims. (Cl. 343—108)

This invention relates to instrument landing aids for aircraft.

The invention utilizes a low-power, light, portable microwave transmitter located at an aircraft landing strip and a small and light receiver positioned on the aircraft. The transmitter emits a beam of microwave radiation, for the purpose of guiding the aircraft to the landing strip. This beam of radiation may be made very narrow, and the invention is therefore well adapted for tactical use at forward military airfields, and particularly for use by light airplanes and helicopters.

The transmitter beam is continuously rotated in a conical scan and the signal energy thereof is derived from a microwave generator which is amplitude modulated by a signal derived from a modulation generator. The modulation generator signal is in turn frequency modulated in synchronism with the rotation of the transmitter beam. Simple circuit components can be added to the transmitter to secure the altitude of the incoming aircraft, which can then be radiophoned to the pilot. In the receiving operation, the conical scan generates amplitude modulation. This and the transmitted frequency modulation are demodulated to secure information to direct the pilot so that he can steer the aircraft toward the beam axis.

The aircraft receiver includes a small antenna pointed forward. A simple detector and preamplifier are associated with the antenna. The remaining receiver components are combined with a cross-pointer indicator in a small package. Those components include frequency and amplitude detectors, simple amplifiers, a phase shifter and two phase detectors. The outputs of the latter operate the two pointers of the indicator to indicate to the pilot the direction in which he must steer to fly down the axis of the transmitter's beam.

The narrow transmitter beam minimizes the possibility of pickup by an enemy. The portability of the transmitter permits it to be carried or parachuted to an isolated landing field such as a clearing for temporary use in a combat theatre. The extreme lightness, simplicity and compactness of the receiver makes it easy to install and use on a light plane or helicopter.

The object of this invention is to provide an approach and landing aid radio system which is easily portable and is simple to operate.

A further understanding of this invention may be secured from the detailed description and drawings, in which:

FIGURE 1 is a block diagram of the transmitter.
FIGURE 2 is a block and schematic diagram of the receiver.
FIGURE 3 is a side view showing an aircraft entering the radio guidance beam.
FIGURES 4, 5 and 6 are beam cross-section diagrams illustrating the operation of the invention.

Referring now to FIGURE 1, a continuous-wave microwave generator 11 applies about one-half watt of microwave energy to an amplitude modulator 12, preferably of the ferrite type. The output is applied to a microwave beam transmitting antenna 13. The beam width of this antenna may be made as large or as small as desired, down to a beam angle of about 1°. It is generally desired, in a tactical radar or radio set, to keep the beam narrow to minimize danger of pickup by the enemy.

The antenna beam is rotated so that its axis describes a cone having an apex angle equal to the beam width angle. In this example a beam width of 1° is selected, and the beam axis describes a cone of 1° apex angle. Beam rotation in a conical scan may be effected in any one of a number of ways. As illustration, the antenna is physically rotated by a motor 14, through gears 16, at an electrical scan speed of 498 c.p.s. Alternatively only a small slotted ring portion of the antenna may be physically rotated as in the Tri-Scanner Antenna disclosed in an article by Jesse L. Butler at pages 401–406 of the 1958 Tenth Annual National Conference on Aeronautical Electronics.

The motor 14 also drives a potentiometer generator 17 emitting a sawtooth electrical waveform having a frequency of 498 c.p.s., equal to the scanning speed of the antenna. The generated waveform may alternatively be sinusoidal. A selected point or phase of the sawtooth form thus represents a particular point in the rotation path of the antenna. The sawtooth phase is made such that its abrupt change point corresponds to the topmost point of the antenna beam rotation. The generator 17 output is applied through a frequency modulator 18 to modulate the frequency of a 10 kc. p.s. oscillator 19. The frequency excursion of the modulation, as an example, is chosen to be 255 c.p.s., so that the oscillator 19 is modulated to emit a signal having a frequency varying between 9,745 c.p.s. and 10,255 c.p.s.

This modulated 10 kc. p.s. signal is applied as a modulating frequency to the modulator 12, where it amplitude modulates the microwave energy before its application to the antenna. Thus the emitted microwave radiation is amplitude modulated at an average frequency of 10 kc. p.s., and the latter is in turn frequency modulated at 498 c.p.s.

The receiver circuit is shown in FIGURE 2. A wide-angle horn antenna 21 receives microwave signals equally well from all points within a 45° cone. The microwave signals are amplitude demodulated by a detector 22 to recover the 10 kc. p.s. amplitude modulation of the transmitter beam. The recovered 10 kc. p.s. signal is amplified in a pre-amplifier 23 and a post-amplifier 24. The 10 kc. p.s. signal is again amplitude detected at 26 to recover any 498 c.p.s. amplitude modulation which may exist. This amplitude modulation, when it exists, is caused by space modulation due to the conical scan of the transmitted beam at 498 c.p.s., as will be explained later. This amplitude modulation at conductor 27 is employed, through an automatic gain control amplifier 28, to control the gain of the pre-amplifier 23. Amplitude modulation at conductor 27 is also amplified in an amplifier 29 tuned to 498 c.p.s. A pair of head phones 30 is connected to the output of the 498 c.p.s. amplifier 29.

The 10 kc. p.s. output of post-amplifier 24 in conductor 31 is additionally frequency detected, the signal being first amplitude limited at 32 then detected in FM discriminator 33 to recover, in conductor 34, the 498 c.p.s. signal employed in the transmitter as frequency modulation. This signal is amplified in an amplifier 36 tuned to 498 c.p.s. The amplified output is applied to one of two identical phase detectors 37 and 38 and to a 90° phase shifter 39.

As phase detectors 37 and 38, a circuit may be employed which is described in the Radiation Laboratory Series, volume 21, Electronic Instruments, by Greenwood and Holdam, on page 384, FIG. 12.14. As phase shifter 39 a suitable circuit is described in Terman's Radio Engineers' Handbook, 1st edition, page 949.

The output of the phase shifter 39 is applied to the other phase detector 38. The output of amplifier 29 is applied to both phase detectors 37 and 38. The outputs of the two phase detectors, 37 and 38, are applied to the movements of a cross-pointer indicator 41. This conventional and widely-used indicator has a face carrying two indicating pointers at right angles, each pointer being actuated by a suitable actuating movement with each pointer being centered at zero actuating current.

In the operation of the tactical landing radar, the ground transmitter 42, FIGURE 3, is positioned at the landing strip and aims its narrow conical beam in the air, in the direction from which an aircraft should approach the strip, at a desired glide slope angle of, perhaps, 3½° to the horizontal. The narrow conical beam is scanned by its rotating antenna in a cone having the rotation axis 43. An aircraft 44 approaching the strip and about to enter the beam would perceive it as having a cross-section shown in FIGURE 4 at 46. This 1° beam section 46 is conically scanned so that its center, 47, describes the 1° circle 48.

Detectible beam energy extends somewhat beyond the 3-db circle 46, so that the airplane 44 can detect the transmitted energy at a distance of several degrees from the scan axis 43. Upon entering the fringe of the transmitted radiation the receiver antenna 21, FIGURE 2, receives energy which is amplitude modulated at 498 c.p.s. because of the scanning motion which sweeps the beam periodically across the airplane. As the airplane approaches the scan axis this amplitude modulation increases in strength, reaching a maximum at the circle 48, FIGURE 4, then decreasing again to zero at the scan axis 43. The changing amplitude of this modulation is thus not adequate, by itself, to guide the pilot to the scan axis of the transmitted energy. However, the earphones 30, FIGURE 2, are provided to give the pilot an audible, qualitative indication that he has found the beam and is entering it.

The received microwave carrier, thus amplitude modulated at 498 c.p.s., is demodulated by the detector 22 to secure the 10 kc. p.s. modulation therefrom, which has also undergone amplitude modulation at 498 c.p.s. because of the microwave modulation. After amplification at the 10 kc. p.s. frequency at 23 and 24 the 498 c.p.s. amplitude modulation thereof is derived by detector 26. The output is employed to gain control the pre-amplifier so as to secure maximum sensitivity for weak signals while avoiding overloading under strong signals. The 498 c.p.s. output is filtered and amplified by amplifier 29.

The received 10 kc. p.s. modulation is amplitude limited by the limiter 32 to remove the 498 c.p.s. space amplitude modulation. The amplitude limited signal is then frequency detected by the discriminator 33 to secure a signal having amplitude at 498 c.p.s. representative of the 498 c.p.s. transmitter frequency modulation. More important, the phase of the 498 c.p.s. amplitude modulation output of discriminator 33 is representative of the phase of the 498 c.p.s. frequency modulation input applied to it.

In FIGURE 5, again representing a cross-section of the transmitted conical scan with rotational axis 43, the beam axis at 47 is rotating in the circle 48. A position of the beam axis at a selected point of the circle 48, as at point 49, corresponds to a selected phase of the rotation of antenna 13, FIGURE 1, and to the corresponding phase of the output of the sawtooth generator 17. This generator ouput signal is reproduced at the output conductor 51 of amplifier 36, FIGURE 2, and the phase of the latter is representative of the phase of the former. Thus the phase applied to the phase detector 37 through conductor 51 is a reference phase explicitly referring to a selected point, as point 49, FIGURE 5, of the transmitted beam cone.

In FIGURE 5, let the aircraft 44 approach the transmitter beam cone so as to cut the locus 48 at the point 52. This point in space is represented by the time phase of a selected point or phase of the output of amplifier 29, FIGURE 2, in conductor 53. This output is also applied to the phase detector 37.

The output of the phase detector 37 is a direct current representing positive or negative phase difference between two inputs by corresponding positive or negative output current flow. This current, through the actuating coil 54, operates the indicator 56 to one side or the other of its center zero position. However, in practice the aircraft will be headed in the general direction of the transmitter as shown in FIGURE 3, so that after the aircraft enters the beam, the relation of the aircraft 44 to the transmitted conically scanned beam 48 is more nearly as shown in FIGURE 6.

Since the phase at 53, FIGURE 2, is related to the aircraft position, it is or can be made to represent the horizontal component, 57, FIGURE 6, of the aircraft position error relative to the scan center 43. This is accomplished by adjusting the phasing of the potentiometer generator 17 with respect to antenna position as previously described and thus the phase of the signal imposed on conductor 51 is properly correlated with antenna position.

The output 51, of the amplifier 36, FIGURE 2, is additionally applied to the phase shifter 39, shifting its phase 90°, and the output is applied to the second, identical phase detector 38. The output signal of this phase detector is thus referenced at 90° to that of detector 37, and represents the vertical error 58, FIGURE 6, of the airplane position. This signal is applied to the actuating coil 59 of the cross-pointer indicator 41, and operates the indicator 61.

The pilot is thus provided with orthogonal error indications. A position of the indicator 56 to the right of zero indicates that the pilot should steer toward the right, when the indicator will move toward zero. Similarly, when the indicator 61 is above the zero mark the pilot should steer upward, or lessen his glide slope angle. When both pointers are at their zero mark they indicate to the pilot, flying within the beam, that he is at the scan axis.

What is claimed is:

1. A radio landing system comprising, a ground based transmitter including a microwave generator, a local oscillator, means for frequency modulating said local oscillator, means for amplitude modulating the output of said microwave generator by the frequency modulated output of said local oscillator, means for radiating said modulated signal in a directed beam, means for rotating said beam about a selected axis at a rate of rotation equal to the frequency of said frequency modulation, the apex angle of the cone of rotation being substantially equal to the width of said directed beam between half-power points, an airborne receiver including an amplitude modulation detector deriving a signal from said beam the frequency of which is dependent on the rate of rotation of said beam, a frequency modulation detector producing an output signal having a frequency equal to the frequency modulation of said transmitter, a first phase detector having the output of said amplitude modulation detector and the output of said frequency modulation detector imposed thereon, a 90° phase shifter having the output of said frequency modulation detector imposed thereon, a second phase detector having the output of said amplitude modulation detector and the output of said phase shifter imposed thereon, and indicator means energized by the outputs of said first and second phase detectors.

2. A radio landing system as set forth in claim 1 in which said indicator means comprises a cross-pointer indicator having first and second movements actuating said pointers, said first movement being energized by the output of said first phase detector and said second movement being energized by the output of said second phase detector.

3. A radio landing system comprising, a ground based transmitter including a microwave generator, a local oscillator, means for frequency modulating said local oscillator, means for amplitude modulating the output of said microwave generator by the frequency modulated output of said local oscillator, means for radiating said modulated signal in a directed beam, means for rotating said beam about a selected axis at a rate of rotation equal to the frequency of said frequency modulation, an airborne receiver including an amplitude modulation detector deriving a signal from said beam the frequency of which is dependent on the rate of rotation of said beam, a frequency modulation detector producing an output having a frequency equal to the frequency modulation of said transmitter, means for detecting the relative phase relation of the output of said frequency modulation detector and said amplitude modulation detector, and indicator means energized by the output of said last mentioned means.

4. A radio landing system comprising, a ground based transmitter including a microwave generator, a local oscillator, means for frequency modulating said local oscillator, means for amplitude modulating the output of said microwave generator by the frequency modulated output of said local oscillator, means for radiating said modulated signal in a directed beam, means for rotating said beam about a selected axis at a rate of rotation equal to the frequency of said frequency modulation, an airborne receiver including an amplitude modulation detector deriving a signal from said beam the frequency of which is dependent on the rate of rotation of said beam, a frequency modulation detector producing an output signal having a frequency equal to the frequency modulation of said transmitter, a first phase detector having the output of said amplitude modulation detector and the output of said frequency modulation detector imposed thereon, a 90° phase shifter having the output of said frequency modulation detector imposed thereon, a second phase detector having the output of said amplitude modulation detector and the output of said phase shifter imposed thereon, and indicator means energized by the outputs of said first and second phase detectors.

References Cited by the Examiner

UNITED STATES PATENTS

| | | | |
|---|---|---|---|
| 2,578,241 | 12/51 | Guanella | 343—106 |
| 2,926,294 | 2/60 | Kerpchar | 343—108 XR |
| 2,954,555 | 9/60 | Guttinger | 343—108 XR |

CHESTER L. JUSTUS, *Primary Examiner.*